United States Patent
Hankins et al.

(10) Patent No.: US 7,720,980 B1
(45) Date of Patent: May 18, 2010

(54) SYSTEM AND METHOD FOR DYNAMICALLY CONTROLLING A ROGUE APPLICATION THROUGH INCREMENTAL BANDWIDTH RESTRICTIONS

(75) Inventors: Scott A. Hankins, Cupertino, CA (US); Brett D. Galloway, Los Altos, CA (US)

(73) Assignee: Packeteer, Inc., Cupertino, CA (US)

( * ) Notice: Subject to any disclaimer, the term of this patent is extended or adjusted under 35 U.S.C. 154(b) by 1169 days.

(21) Appl. No.: 11/031,279

(22) Filed: Jan. 7, 2005

Related U.S. Application Data

(63) Continuation of application No. 09/885,750, filed on Jun. 19, 2001, now abandoned.

(51) Int. Cl.
*G06F 15/16* (2006.01)
(52) U.S. Cl. .................... 709/229; 709/224
(58) Field of Classification Search ............ 709/223, 709/225, 229, 232, 224
See application file for complete search history.

(56) References Cited

U.S. PATENT DOCUMENTS

| | | | |
|---|---|---|---|
| 6,262,976 B1 * | 7/2001 | McNamara ............... 709/238 |
| 6,343,085 B1 * | 1/2002 | Krishnan et al. ............. 370/468 |
| 6,578,077 B1 * | 6/2003 | Rakoshitz et al. ............ 709/224 |
| 7,324,447 B1 * | 1/2008 | Morford ....................... 370/231 |
| 7,554,983 B1 * | 6/2009 | Muppala ...................... 370/392 |
| 2004/0221032 A1 * | 11/2004 | Bernstein et al. ............ 709/224 |

OTHER PUBLICATIONS

W.R. Stevens, "TCP/IP Illustrated, vol. 1, The Protocols," 1994, Chs. 1-3, Addison Wesley.

* cited by examiner

*Primary Examiner*—Ramy M Osman
(74) *Attorney, Agent, or Firm*—Baker Botts L.L.P.

(57) ABSTRACT

A system and method for dynamically controlling a rogue application through incremental bandwidth restrictions is disclosed. A network connection supporting a flow of network traffic in a distributed computing environment is monitored. The network traffic flow includes a stream of data packets generated by a rogue application. Bandwidth allocated to the monitored network connection is incrementally adjusted until the flow of the network traffic for the rogue application achieves a steady state of bandwidth restriction. The flow of subsequent network traffic over the monitored network connection is controlled at the steady state of bandwidth restriction.

28 Claims, 7 Drawing Sheets

SYSTEM AND METHOD FOR DYNAMICALLY CONTROLLING A ROGUE APPLICATION THROUGH INCREMENTAL BANDWIDTH RESTRICTIONS

CROSS-REFERENCE TO RELATED APPLICATION

This patent application is a continuation of commonly-assigned U.S. patent application Ser. No. 09/885,750, filed Jun. 19, 2001, now abandoned, the disclosure of which is incorporated by reference.

COPYRIGHT NOTICE

A portion of the disclosure of this patent document contains material subject to copyright protection. The copyright owner has no objection to the facsimile reproduction by anyone of the patent document or the patent disclosure as appearing in the Patent and Trademark Office patent file or records, but otherwise reserves all copyright rights whatsoever.

FIELD OF THE INVENTION

The present invention relates in general to network traffic control and, in particular, to a system and method for dynamically controlling a rogue application through incremental bandwidth restrictions.

BACKGROUND OF THE INVENTION

Distributed computing environments, particularly enterprise computing environments, typically comprise an collection of individual subnetworks interconnected both within and externally via hubs, routers, switches and similar devices. These subnetworks generally fall into two categories. Intranetworks, or Local Area Networks (LANs), are computer networks physically defined within a geographically limited area, such as within an office building. Intranetworks typically operate with a bandwidth of 10 Mbps to 100 Mbps or higher.

Internetworks, or Wide Area Networks (WANs), are computer networks physically defined over a geographically distributed area utilizing private and leased lines obtained through digital communications service providers. The Internet is an example of a widely available public internetwork. Due to the increased complexity of communicating over long distances, network traffic exchanged over internetworks is significantly more costly and generally travels much more slowly than network traffic sent over intranetworks. Internetworks typically operate with a bandwidth of 1.544 Mbps (for a T1 carrier) to 44.7 Mbps (for a T3 carrier) or higher.

Commonly, both intranetworks and internetworks operate in accordance with the Transmission Control Protocol/Internet Protocol (TCP/IP), such as described in W. R. Stevens, "TCP/IP Illustrated, Vol. 1, The Protocols," Chs. 1-3, Addison Wesley (1994), the disclosure of which is incorporated by reference. TCP/IP is a layered networking protocol, comprising a media layer on the physical side, upwards through link, network, transport and application layers. The link and network layers are point-to-point layers and the transport and application layers are end-to-end layers. Packets travel end-to-end and include both source and destination addresses and ports to identify the location of and logical channels on their originating and receiving hosts, respectively. Intranetworks are often interconnected to internetworks and gateway routers are used to provide transparent translations of device addresses between subdomain address spaces and the internetwork domain address spaces.

A traffic manager can be co-located at the network domain boundary with a gateway router to monitor and analyze transient packet traffic for use in traffic analysis and flow control. Traffic managers optimize bandwidth utilization on internetwork connections, as these connections are costly and relatively slow compared to intranetwork connections. In addition, some traffic managers perform load balancing to ensure even traffic distribution.

Typically, traffic managers implement bandwidth utilization policies that attempt to balance the needs of individual end-user applications competing for a limited share of the bandwidth available over the internetwork connection. Thus, a traffic manager will first examine the contents of network traffic packets to determine the application to which each packet belongs. Based on the policies in force, the traffic manager will either restrict or relax the bandwidth allocated to each application.

A problem arises with a certain class of proscribed or "rogue" applications. These applications resist efforts at detection and actively take evasive actions or some forms of negative response when placed under a bandwidth restriction by a traffic manager. Evasive action is known as morphing, whereby the rogue application dynamically changes the operational characteristics of network packet traffic in response to a perceived restriction on the allocated bandwidth. The evasive actions often consist of a switching of client-server roles or the reassignment of source and destination addresses and ports, also known as address or port "hopping."

One specific rogue application that has recently become problematic, particularly in academic network settings, is an on-line music exchange service, known as "Napster." The Napster service deploys particularly aggressive forms of rogue applications which attempt to monopolize a maximum amount of available internetwork bandwidth. Other related, but not quite as aggressive, services include Gnutella, Imesh, and Scour, although other forms of rogue applications exist and still others continue to evolve.

In the prior art, firewalls provide one solution to combating bandwidth monopolization by rogue applications. A typical firewall will apply a packet filter based on network addresses to disallow proscribed packet traffic originating from or destined to identified machines. However, firewalls are inflexible and offer an all-or-nothing solution. The use of packet filters requires a priori knowledge of the network addresses utilized by rogue applications and firewalls are therefore easily overridden by simply dynamically changing the network addresses in use.

Prior art traffic managers also provide limited protection against rogue applications. These devices block network traffic generated by rogue applications based on a broader set of characteristics, including the network ports and traffic direction flow. However, traffic managers are not capable of detecting evasive actions and are therefore easily overridden using the same tactics as for firewalls.

Therefore, there is a need for an approach to identifying and controlling rogue applications in traffic-managed distributed computing environments. Preferably, such an approach would systematically limit bandwidth usage by each rogue application without triggering any evasive actions or other forms of negative response.

There is a further need to provide an approach to identifying and controlling rogue applications through a dynamic feedback mechanism. Preferably, such an approach would detect the bandwidth restriction threshold which will trigger evasive action or other form of negative response and then incrementally relax any network restrictions until a point of acquiescence is achieved.

SUMMARY OF THE INVENTION

The present invention provides a system and method for identifying and controlling proscribed rogue applications that take evasive actions or other forms of negative response and attempt to monopolize limited internetwork bandwidth. Packet traffic flows are analyzed and the individual operational characteristics of each packet are checked against those characteristics known to be used by packets exchanged with rogue applications. These operational characteristics include network addresses, ports and semantic characteristics, such as keywords and packet lengths. Upon identifying a flow belonging to a rogue application, the bandwidth is incrementally restricted until an evasive action or other form of negative response is triggered. Thereafter, the bandwidth is relaxed by at least one increment to avoid triggering evasive action or other form of negative response.

An embodiment of the present invention is a system and method for managing network traffic exchanged with a proscribed application capable of taking evasive action. Flow characteristics of network traffic are analyzed. The network traffic includes a multiplicity of transient packets. Each packet includes a parameterized header. Operational characteristics are retrieved from the parameterized header of each such transient packet generated by a plurality of intercommunicating applications. A proscribed application is identified by comparing the operational characteristics to stored characteristics unique to the proscribed application. Transmission of each such transient packet subsequently exchanged with the proscribed application is controlled.

A further embodiment is a system and method for dynamically controlling a rogue application through incremental bandwidth restrictions. A network connection supporting a flow of network traffic in a distributed computing environment is monitored. The network traffic flow includes a stream of data packets generated by a rogue application. Bandwidth allocated to the monitored network connection is incrementally adjusted until the flow of the network traffic for the rogue application achieves a steady state of bandwidth restriction. The flow of subsequent network traffic over the monitored network connection is controlled at the steady state of bandwidth restriction.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
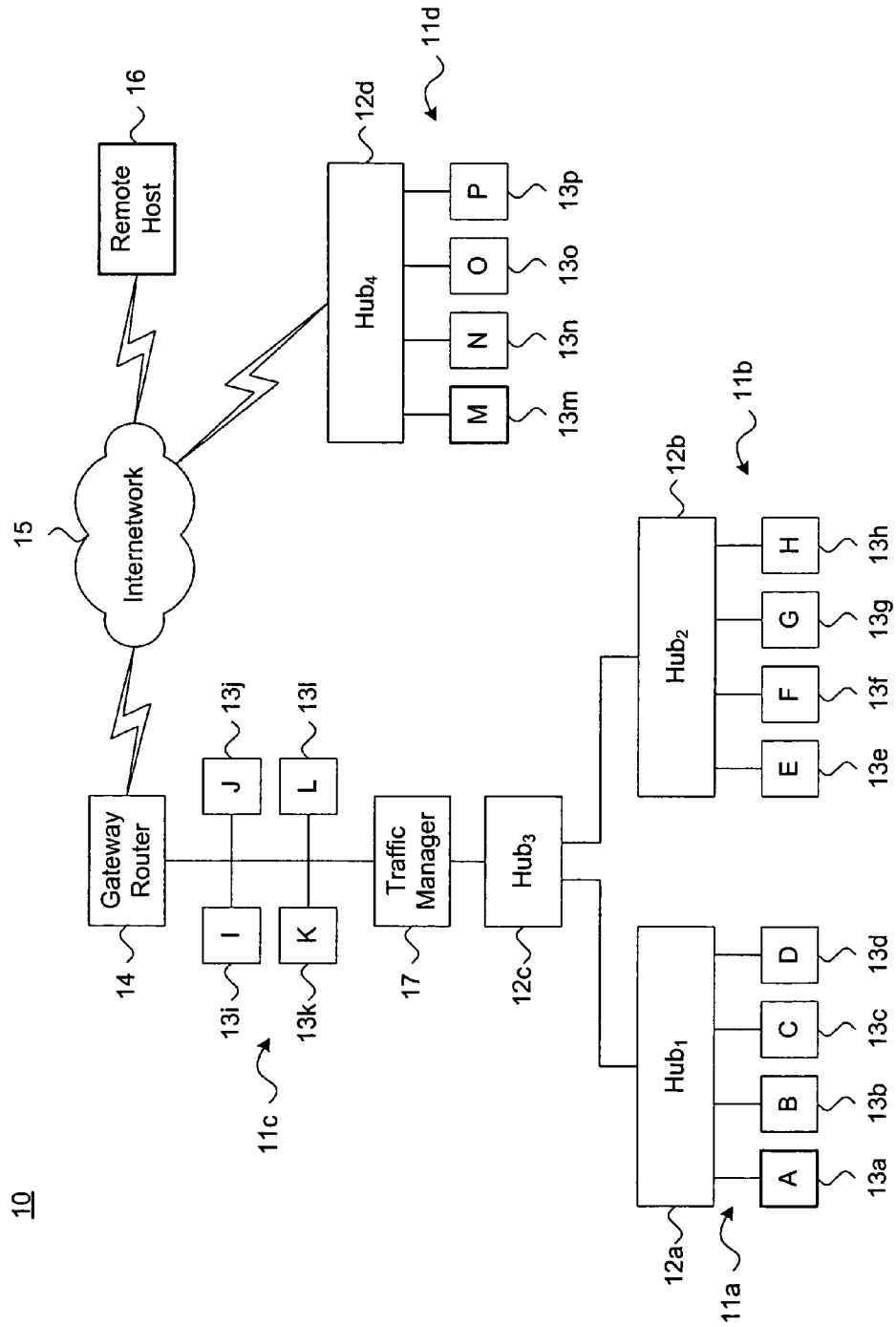
FIG. 1 is a block diagram showing a system for dynamically controlling a rogue application through incremental bandwidth restrictions in accordance with the present invention.

FIG. 1 is a block diagram showing a system for dynamically controlling a rogue application through incremental bandwidth restrictions 10, in accordance with the present invention. By way of example, a set of intranetworks 11$a$, 11$b$, 11$c$ each define separate subnetworks. The individual systems 13$a$-$d$ and 13$i$-$l$ are part of the same logical subnetwork, although the physical addresses of the system are on separate segments. The individual systems 13$e$-$h$ are part of a separate logical subnetwork. Finally, the individual systems 13$m$-$p$ are part of a subnetwork physically distinct from the intranetworks 11$a$, 11$b$ and remotely located over an internetwork 15.

Internally, the individual systems 13$a$-$d$ and 13$e$-$h$ each are interconnected by a hub 12$a$, 12$b$ or similar device. In turn, each hub 12$a$, 12$b$ is interconnected via a boundary hub 12$c$ which feeds into a gateway router 14 at the network domain boundary. The gateway router 14 provides connectivity to the intranetwork 11$c$ and one or more remote hosts 16 via the internetwork 15. Other network topologies and configurations are feasible, including various combinations of intranetworks and internetworks, as would be recognized by one skilled in the art. In the described embodiment, both the internetwork 15 and individual intranetworks 11$a$, 11$b$, 11$c$ are IP compliant.

Packets are exchanged between the individual systems 13$a$-$d$, 13$e$-$h$, 13$i$-$l$, and 13$m$-$p$ in the intranetworks 11$a$, 11$b$, 11$c$ and remote hosts 16 in the internetwork 15. All packet traffic travels between the separate intranetworks 11$a$, 11$b$, 11$c$ and to and from the internetwork 15 by way of the gateway router 14. Note the packets sent to and from individual systems 13$a$-$d$ and 13$i$-$l$ within the intranetwork 11$a$ do not go through gateway router 14. While in transit, the packet traffic flows through a traffic manager 17 which monitors and analyzes the traffic for traffic management and flow control. Packet traffic is dynamically classified for use in controlling bandwidth allocation according to automatically determined application requirements, such as described in commonly-assigned U.S. patent application Ser. No. 09/198, 090, filed Nov. 23, 1998, pending, the disclosure of which is incorporated by reference.

As further described below, beginning with reference to FIG. 4, the traffic manager 17 identifies network traffic generated by proscribed "rogue" applications and incrementally applies bandwidth restrictions up to a dynamically determined bandwidth threshold. Rogue applications resist efforts at detection and actively take evasive actions or some forms of negative responses when placed under a bandwidth restriction by the traffic manager 17. For instance, a rogue application executing on system 13$a$ might attempt to evade bandwidth restrictions placed on a connection with remote system 13$m$ by changing the direction of the transfer, network addresses, or ports. Instead, the traffic manager 17 "tolerates"

the transfer by allocating minimal bandwidth calculated to avoid triggering evasive actions or negative responses by the rogue application.

The individual computer systems, including systems 13*a-d*, 13*e-h*, 13*i-l*, 13*m-p* and remote hosts 16, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2A:
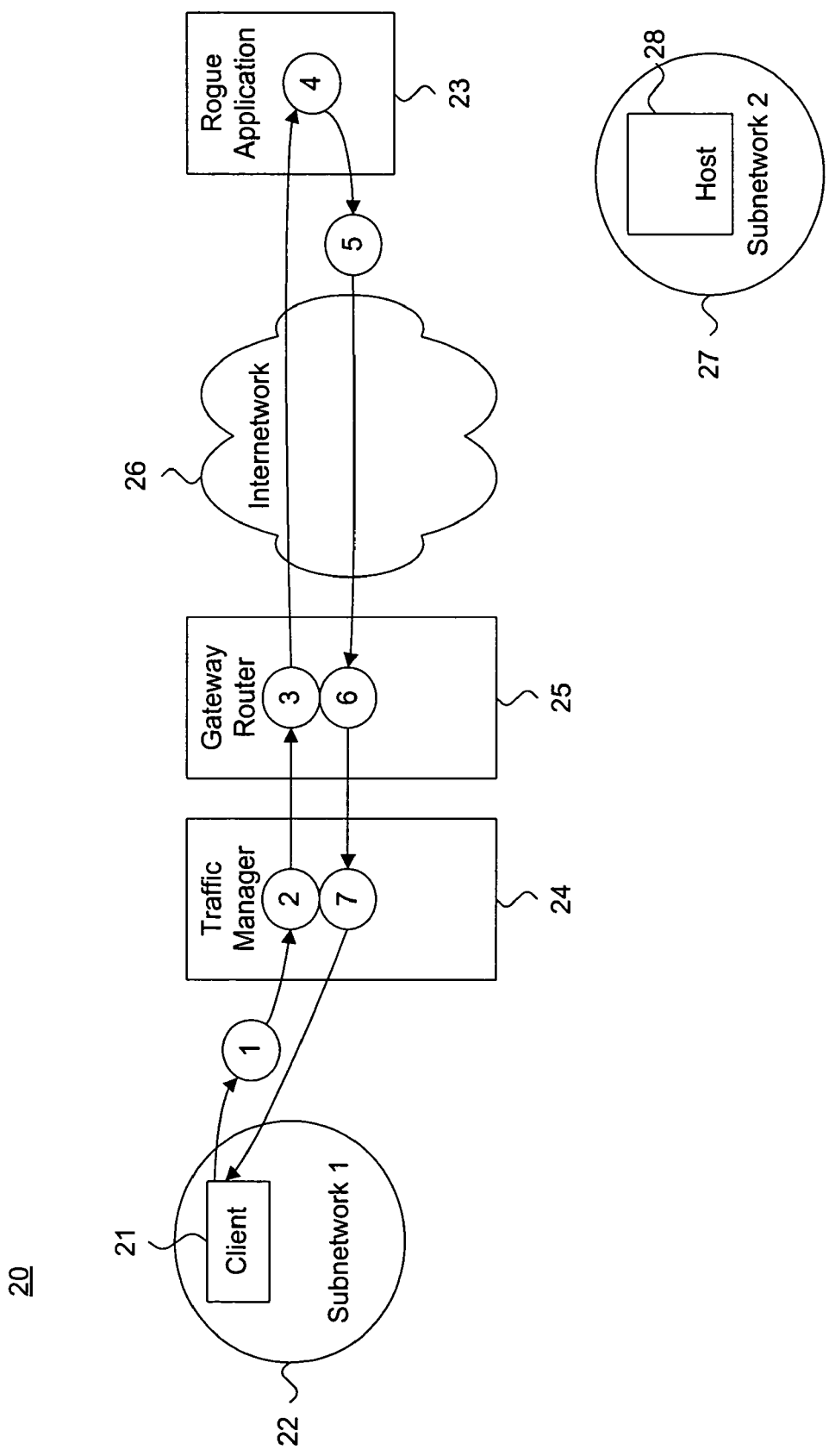
FIG. 2A is a topological network diagram showing a file transfer setup operation facilitated by a rogue application.

FIG. 2A is a topological network diagram showing a file transfer setup operation 20 facilitated by a rogue application 23. By way of example, a client 21 executing on a system 21 operating within a first subnetwork 22 is attempting to perform a bandwidth-intensive file transfer using file transfer services provided by the rogue application 23 remotely located over the internetwork 15. The rogue application 23 facilitates file transfers by identifying hosts 28 at which individual files are stored for download.

To initiate a file transfer, the client 21 sends a request (step ①) to the rogue application 23. The request passes through the traffic manager 24 (step ②) and gateway router 25 (step ③) until received at the rogue application 23 via the internetwork 26 (step ④). The rogue application 23 determines a host 28, possibly located in a separate subnetwork 27, and sends a reply (step ⑤) back to the client 21. The reply follows the same path through the internetwork 26, the gateway router 25 (step ⑥), and traffic manager (step ⑦) in returning back to the client 21. Upon receiving the response, the client 21 begins the actual file transfer download.

Figure 2B:
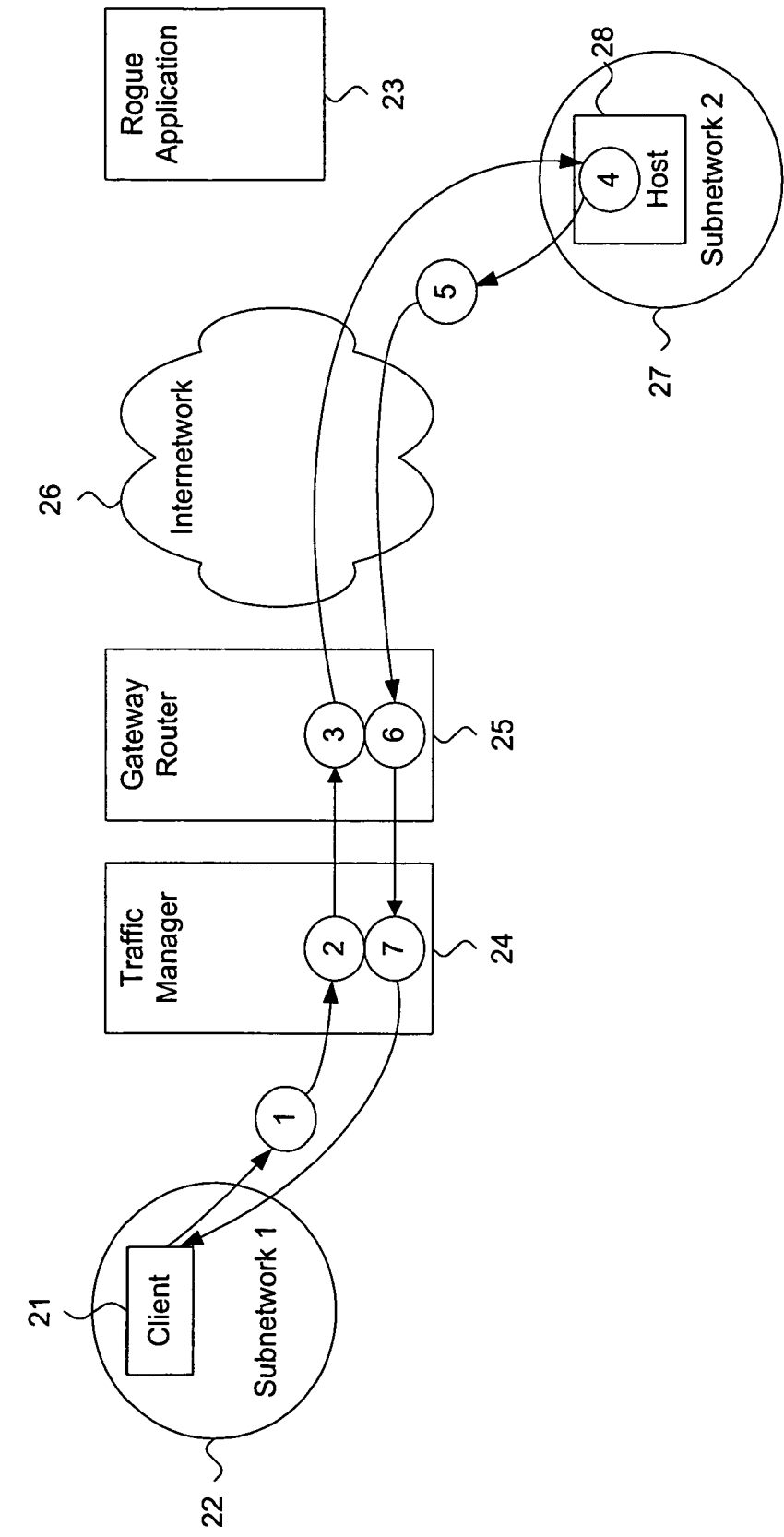
FIG. 2B is a topological network diagram showing the file transfer download operation transacted with a remote host.

FIG. 2B is a topological network diagram showing the file transfer download operation 29 transacted with a remote host 28. As the rogue application 23 does not actually store the requested file, the client 21 attempts to obtain the file from the host 28 identified by the rogue application 23. The host 28 is remotely located over the internetwork 26 in a separate subnetwork 27. Consequently, all file transfers with the host 28 consume limited bandwidth on the internetwork connection.

The client 21 sends a file transfer request (step ①) to the identified host 28. The request again travels through the traffic manager 24 (step ②) and the gateway router 25 (step ③) and is sent via the internetwork 26. The request is received by the host 28 (step ④) which retrieves the requested file and generates a reply (step ⑤) that is sent back to the client 21. The reply is sent over the internetwork 26 and through the gateway router 25 (step ⑥) and traffic manager 24 (step ⑦).

Figure 3:
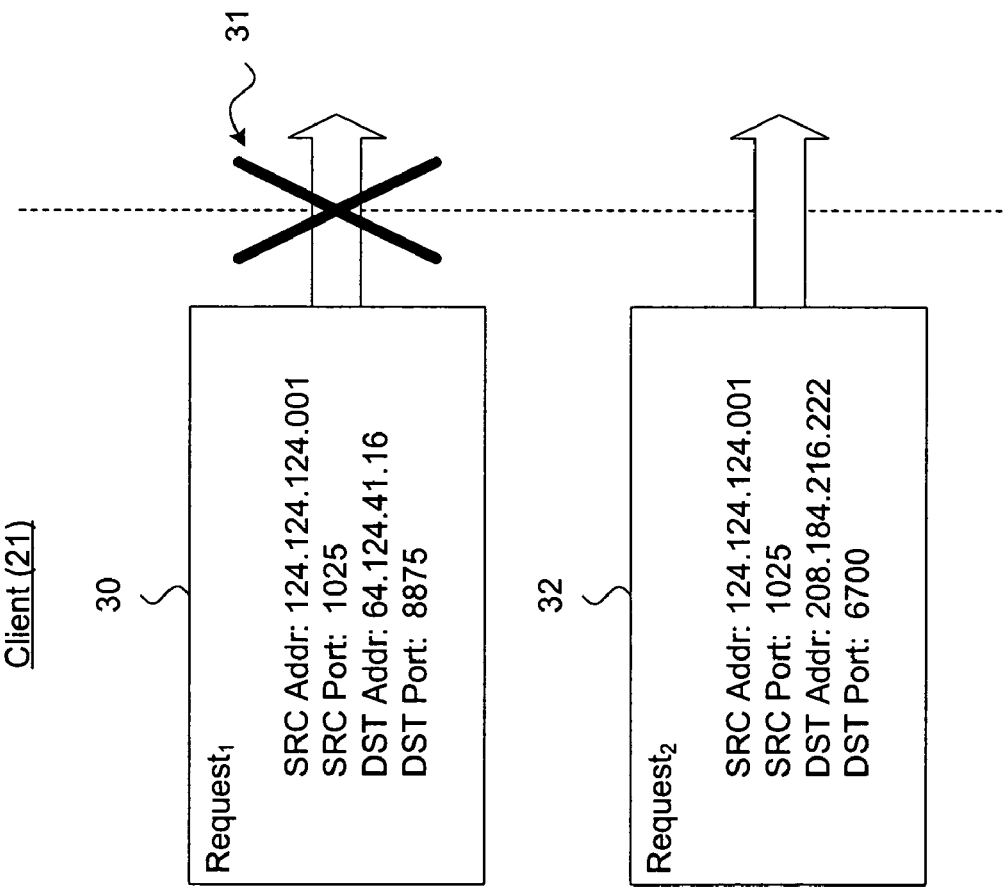
FIG. 3 is a block diagram showing network traffic including packets generated to evade bandwidth restrictions.

To avoid detection and any bandwidth restrictions imposed by the traffic manager 24, the client 21 and rogue application 23 can dynamically change the operational characteristics of the file transfer. FIG. 3 is a block diagram showing network traffic including packets generated to evade bandwidth restrictions. The client 21 initially generates and attempts to send a request packet 30 to the rogue application 23. By way of example, the request packet 30 includes a source address (SRC Addr) of 124.124.124.001, source port (SRC Port) of 1025, destination address (DST Addr) of 64.124.41.16 and destination port (DST Port) of 8875.

However, the reply packet 31 might be blocked, such as by a firewall or traffic manager 17 (shown in FIG. 1). If no reply is received from the rogue application 23 within a set time period, the rogue application 23 will take evasive action or generate some form of negative response by changing the operational characteristics of the file transfer request 30 and generates a new request packet 32 addressed to a "new" system located at a network address different from the system to which the request packet 30 was originally sent. Again, by way of example, the new request packet 32 has a destination address (DST Addr) of 208.184.216.222 and destination port (DST Port) of 6700. Notably, the destination address and port are different than that specified in the request packet 30 of 64.124.41.16 and 8875, respectively.

Upon receiving the reply packet 31, the client 21 will begin sending subsequent request packets 32 using the new operational characteristics as the source address and port.

Figure 4:
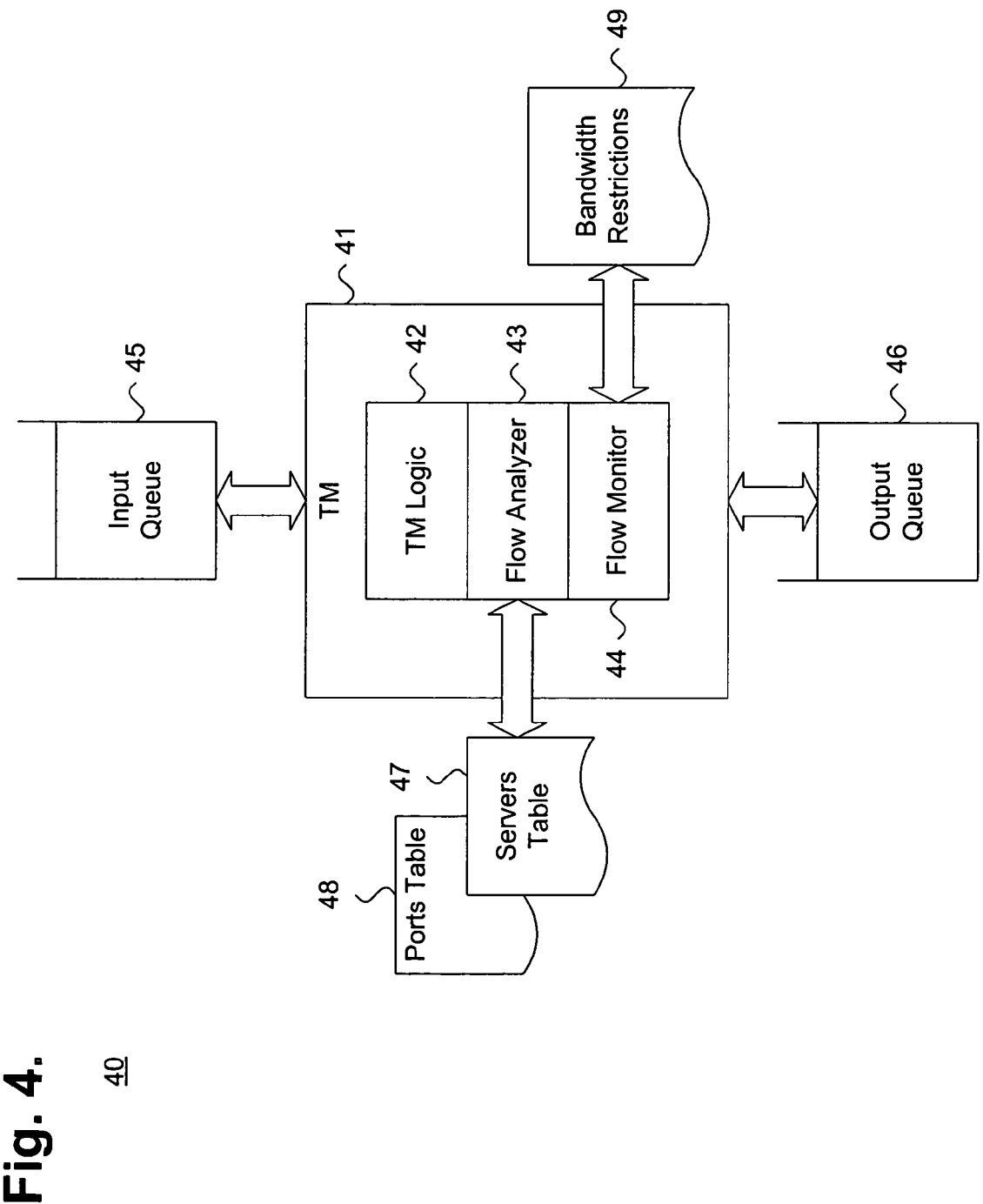
FIG. 4 is a functional block diagram showing the modules of the system of FIG. 1.

FIG. 4 is a functional block diagram showing the modules 40 of the system of FIG. 1. The system 40 is implemented within the traffic manager 17 (shown in FIG. 1) and works in conjunction with the basic traffic manager logic 41. The traffic manager 17 operates in a promiscuous mode, wherein all network traffic passes through. To address the problem of packet traffic being exchanged by systems spanning the network domain boundary yet located within the same subnetwork, the traffic manager 17 stores the physical media access controller (MAC) address of the gateway router 14. Packets outbound from the traffic manager 17 having a MAC address other than that of the gateway router 14 are identified as intranetwork packets and are handled in the same manner as any other intra-intranetwork or intranetwork-to-intranetwork packet.

An exemplary example of a traffic manager 17 suitable for use in the present invention is the Packet Shaper product operating in conjunction with Packet Wise software, version 5.0.0, sold and licensed by Packeteer, Inc., of Cupertino, Calif. In the described embodiment, the traffic manager 24 adjusts the TCP window size parameter to control and restrict the amount of bandwidth used by each of the subscribing applications within each subnetwork. The traffic manager 17 looks at traffic at multiple network layers, including the network, transport and application layers.

The system 40 consists of two basic modules. A flow analyzer module 43 analyzes packets transiting the traffic manager 17. The analyzer 43 inspects the source and destination addresses and ports of each transient packet as queued into an inside packet queue 45 and an outside packet queue 46. The inside packet queue 45 stages packets being received from and forwarded to the internal intranetwork domain. The outside packet queue 46 stages packets being received from and forwarded to the external internetwork domain. The analyzer module 43 analyzes the flow characteristics of the transient packet traffic to identify potentially proscribed flows connecting to rogue applications. The flow analyzer 43 examines the contents of each packet and compares the operational characteristics against addresses maintained in a servers table 47 and logical channels monitored in a ports table 48. Identified proscribed flows are forwarded to the flow monitor 44 for further handling.

The flow monitor 44 monitors and imposes bandwidth restrictions 49 on transient packet traffic flowing over the network domain boundary. In the ordinary case of a non-rogue application, the bandwidth restrictions 49 generally present no impediment to ongoing communications. However, when dealing with rogue applications, the bandwidth restrictions 49 can provoke evasive actions or some forms of negative responses designed to subvert the intention of bandwidth restrictions 49. Consequently, the flow monitor 44 will incrementally increase the bandwidth restrictions 49 placed on a proscribed flow with a rogue application up to a dynamically determined threshold, ideally just short of a point where the bandwidth restriction would trigger an evasive action or some form of negative response from the rogue application.

The flow monitor 44 thus prevents rogue applications from subverting traffic management efforts through means such as the switching of client-server roles or the reassignment of source and destination addresses and ports, also known as address or port "hopping."

Each module within the system 40 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The system 40 operates in accordance with a sequence of process steps, as further described below beginning with reference to FIG. 6.

Figure 5:
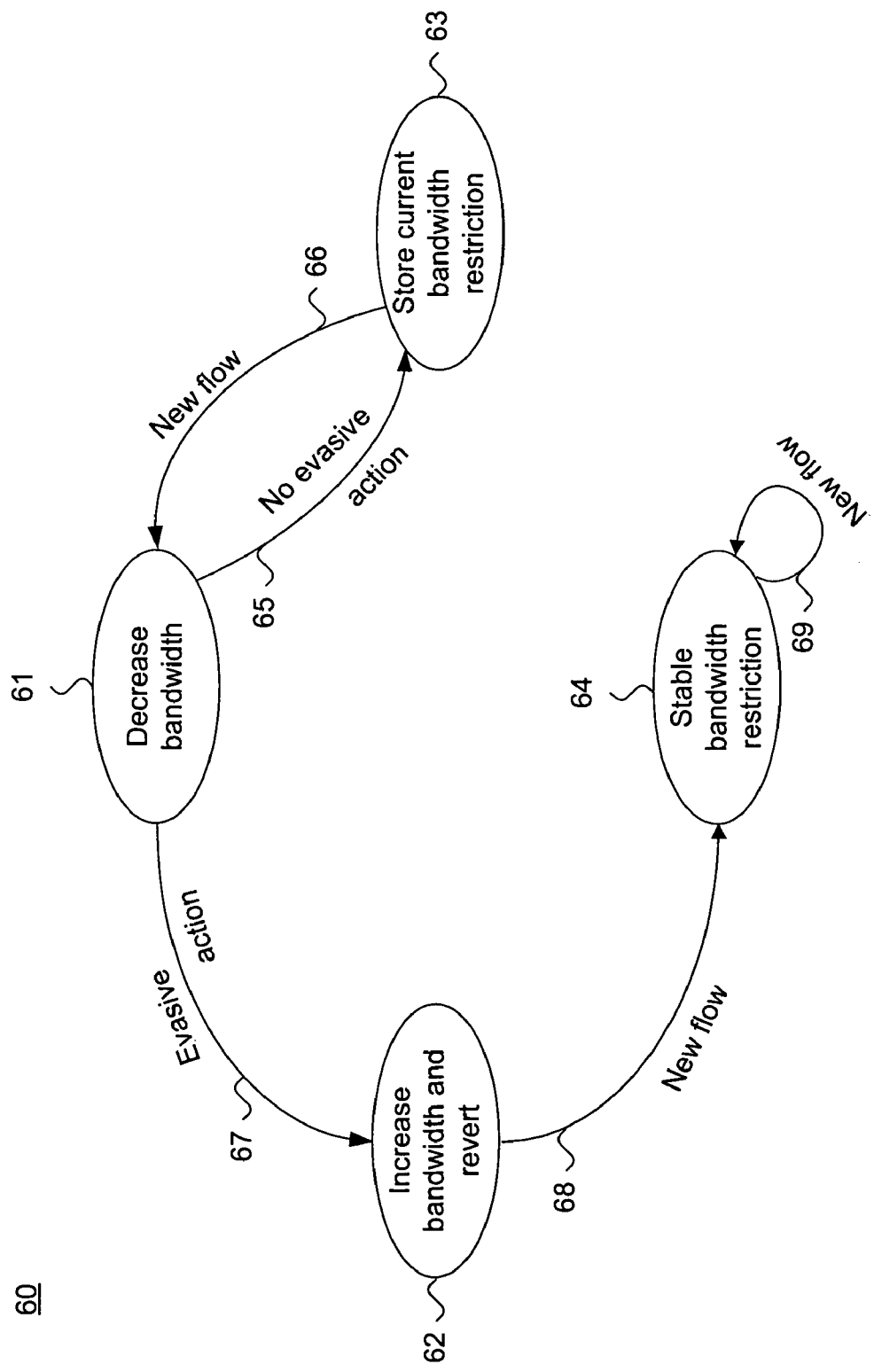
FIG. 5 is a state diagram showing a finite state machine for identifying an evasive action threshold.

FIG. 5 is a state diagram showing a finite state machine 60 for identifying an evasive action threshold. Each rogue application has a bandwidth restriction threshold that triggers evasive action or other form of negative response. The traffic manager 17 can dynamically identify the threshold by incrementally increasing the bandwidth restrictions 49 (shown in FIG. 4) until the evasive action or other form of negative response is triggered, after which the bandwidth restriction 49 is relaxed about one increment. The bandwidth restrictions 49 are adjusted once per flow and any bandwidth restriction changes will take effect upon the next communication with the rogue application.

There are four states applying to the bandwidth restrictions 49: decrease 61, increase and revert 62, store 63, and stable 64. In effect, the traffic manager 41 will oscillate between decreasing bandwidth 61 and increasing bandwidth 62 until a stable bandwidth restriction 64 is found.

The traffic manager 41 begins by decreasing the bandwidth 61 allocated to a flow identified with a rogue application. If the rogue application takes evasive action or other form of negative response (transition 67), the traffic manager 41 increases the bandwidth 62, preferably by one increment back to the last stored bandwidth restriction. Upon the next new flow (transition 68), the bandwidth restriction will be stable 64 and each subsequent new flow (transition 69) will be restricted to the same stable bandwidth amount.

Otherwise, if the decrease in bandwidth 61 does not trigger evasive action or other form of negative response (transition 65), the new current bandwidth restriction 49 is stored 63. The stored bandwidth restriction is then used upon the next new flow with the rogue application (transition 66).

Figure 6:
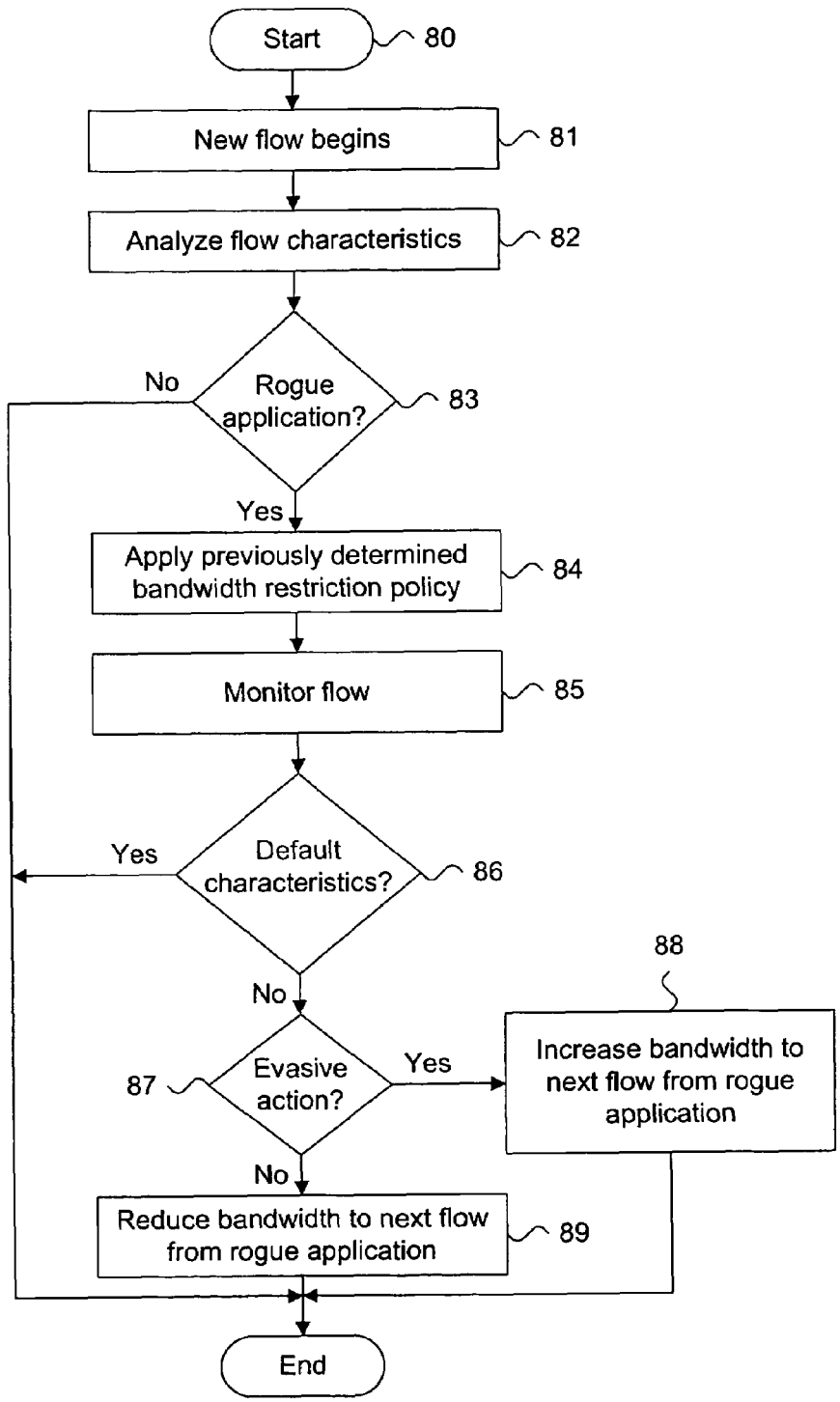
FIG. 6 is a flow diagram showing a method for dynamically controlling a rogue application through incremental bandwidth restrictions in accordance with the present invention.

FIG. 6 is a flow diagram showing a method for controlling aggressive rogue applications 80 in a distributed computing environment in accordance with the present invention. The purpose of this routine is to identify and control packet traffic exchanged with a rogue application. The routine will incrementally restrict bandwidth until evasive action or other form of negative response is triggered and then back off to a point of stable bandwidth restriction on subsequent flows.

Thus, upon the start of a new flow with a rogue application (block 81), the flow characteristics will be analyzed (block 82) using conventional traffic classification methodologies, as would be recognized by one skilled in the art, such as described in commonly-assigned U.S. Pat. No. 6,412,000, issued Jun. 25, 2002, the disclosure of which is incorporated by reference. If the flow belongs to a rogue application (block 83), the bandwidth restriction control loop (blocks 84-89) (as described above with reference to FIG. 5) is performed. Any previously determined bandwidth restriction policy is applied (block 84) and the flow is monitored (block 85). If the rogue application performs using the default operational characteristics, such as known network addresses and ports (block 86); no further actions are required. Otherwise, if the rogue application is not performing in accordance with default characteristics (block 86) and is taking evasive action or other form of negative response (block 87), the bandwidth is increased on the next flow with the rogue application (block 88), preferably by one increment up to a maximum limit to the bandwidth. Otherwise, if no evasive action or other form of negative response has been taken (block 87), the bandwidth to the rogue application is reduced on the next flow (block 89). The method then terminates.

While the invention has been particularly shown and described as referenced to the embodiments thereof, those skilled in the art will understand that the foregoing and other changes in form and detail may be made therein without departing from the spirit and scope of the invention.

What is claimed is:

1. An apparatus for managing network traffic exchanged with a proscribed application capable of taking evasive action, comprising:

a processor;

a memory; and computer-executable program code stored in a storage medium and executable by the processor, the computer-executable program code comprising a flow analyzer module comprising computer-executable instructions for analyzing flow characteristics of network traffic comprising a multiplicity of transient packets each including a parameterized header, comprising:

a parser module comprising computer-executable instructions configured, when executed by the processor, to cause the processor to retrieve operational characteristics from the parameterized header of each such transient packet generated by a plurality of inter-communicating applications;

a comparator module comprising computer-executable instructions configured, when executed by the processor, to cause the processor to identify a proscribed application by comparing the operational characteristics to stored characteristics unique to the proscribed application; and a flow monitor module comprising computer-executable instructions configured, when executed by the processor, to cause the processor to control transmission of each such transient packet subsequently exchanged with the proscribed application, comprising:

a traffic manager module comprising computer-executable instructions configured, when executed by the processor, to cause the processor to dynamically and incrementally restrict bandwidth allocated to the network traffic specifically exchanged with the proscribed application until an evasive action is detected, wherein the evasive action comprises an action associated with the proscribed application that changes one or more operational characteristics of network traffic of the proscribed application.

2. An apparatus according to claim 1, further comprising: a classifier module comprising computer-executable instructions configured, when executed by the processor, to cause the processor to classify at least one of a connection to the proscribed application by examining connection initialization operational characteristics, a login to the proscribed application by examining session initiation operational characteristics, and a raw data flow to the proscribed application by examining data flow operational characteristics.

3. An apparatus according to claim 1, further comprising: a bandwidth restriction store recording a bandwidth restriction threshold at which the evasive action by the proscribed application was triggered.

4. An apparatus according to claim 1, wherein the traffic manager module further comprises computer-executable instructions configured, when executed by the processor, to cause the processor to relax the bandwidth allocated to the network traffic specifically exchanged with the proscribed application by at least one increment responsive to the evasive action.

5. An apparatus according to claim 1, wherein the operational characteristics comprise at least one of a network address, port and traffic direction flow.

6. The apparatus of claim 1 wherein the action comprises port hopping.

7. The apparatus of claim 1 wherein the action comprises address hopping.

8. The apparatus of claim 1 wherein the action comprises switching of client-server roles.

9. The apparatus of claim 1 wherein the action is an attempt to evade detection of the proscribed application.

10. A method for managing network traffic exchanged with a proscribed application capable of taking evasive action, comprising:
analyzing, at a network device operably connected to a network communications path, flow characteristics of network traffic comprising a multiplicity of transient packets each including a parameterized header, comprising:
retrieving operational characteristics from the parameterized header of each such transient packet generated by a plurality of intercommunicating applications;
identifying a proscribed application by comparing the operational characteristics to stored characteristics unique to the proscribed application; and
controlling transmission of each such transient packet subsequently exchanged with the proscribed application, comprising:
dynamically and incrementally restricting bandwidth allocated to the network traffic specifically exchanged with the proscribed application until an evasive action is detected, wherein the evasive action comprises an action associated with the proscribed application that changes one or more operational characteristics of network traffic of the proscribed application.

11. A method according to claim 10, further comprising: classifying at least one of a connection to the proscribed application by examining connection initialization operational characteristics, a login to the proscribed application by examining session initiation operational characteristics, and a raw data flow to the proscribed application by examining data flow operational characteristics.

12. A method according to claim 10, further comprising: recording a bandwidth restriction threshold at which the evasive action by the proscribed application was triggered.

13. A method according to claim 10, further comprising: relaxing the bandwidth allocated to the network traffic specifically exchanged with the proscribed application by at least one increment responsive to the evasive action.

14. A method according to claim 10, wherein the operational characteristics comprise at least one of a network address, port and traffic direction flow.

15. A computer-readable storage medium holding code for performing the method according to claim 10.

16. An apparatus for dynamically controlling a rogue application through incremental bandwidth restrictions, comprising:
a processor;
a memory; and
computer-executable program code stored in a storage medium and executable by the processor, the computer-executable program code comprising
a flow monitor module comprising computer-executable instructions configured, when executed by the processor, to cause the processor to
monitor a network connection supporting a flow of network traffic in a distributed computing environment, the network traffic flow comprising a stream of data packets generated by a rogue application, and
incrementally adjust bandwidth allocated to the monitored network connection until the flow of the network traffic for the rogue application achieves a steady state of bandwidth restriction, comprising:
the flow monitor module further comprising computer-executable instructions operative, when executed by the processor, to cause the processor to dynamically decrease the bandwidth allocated to the monitored network connection for each new flow of network traffic until an evasive action by the rogue application is detected, wherein the evasive action comprises an action associated with the proscribed application that changes one or more operational characteristics of network traffic of the proscribed application; and
a traffic manager module comprising computer-executable instructions configured, when executed by the processor, to cause the processor to control the flow of subsequent network traffic over the monitored network connection at the steady state of bandwidth restriction.

17. An apparatus according to claim 16, wherein the flow monitor module further comprises computer-executable instructions configured to cause the processor to increase the bandwidth allocated to the monitored network connection for a subsequent new flow of network traffic responsive to the evasive action.

18. An apparatus according to claim 16, wherein the flow monitor module further comprises computer-executable instructions configured, when executed by the processor, to cause the processor to store the steady state of bandwidth restriction as a retrievable traffic flow control.

19. An apparatus according to claim 16, further comprising: a flow analyzer module comprising computer-executable instructions configured, when executed by the processor, to cause the processor to perform at least one of identifying evasive action or other form of negative response taken by the rogue application and examining at least one of a network address, port and characteristics stored as parameters in a header of each such packet.

20. An apparatus according to claim 16, wherein the flow monitor module further comprises computer-executable instructions configured, when executed by the processor, to cause the processor to monitor a redirected packet flow facilitated by the rogue application.

21. An apparatus according to claim 16, wherein the steady state of bandwidth restriction is sufficient to not trigger evasive action or other form of negative response by the rogue application.

22. A method for dynamically controlling a rogue application through incremental bandwidth restrictions, comprising:
monitoring, at a network device operably connected to a network communications path, a network connection supporting a flow of network traffic in a distributed computing environment, the network traffic flow comprising a stream of data packets generated by a rogue application;

incrementally adjusting bandwidth allocated to the monitored network connection until the flow of the network traffic for the rogue application achieves a steady state of bandwidth restriction, comprising:

dynamically decreasing the bandwidth allocated to the monitored network connection for each new flow of network traffic until an evasive action by the rogue application is detected, wherein the evasive action comprises an action associated with the proscribed application that changes one or more operational characteristics of network traffic of the proscribed application; and controlling the flow of subsequent network traffic over the monitored network connection at the steady state of bandwidth restriction.

23. A method according to claim 22, further comprising:

increasing the bandwidth allocated to the monitored network connection for a subsequent new flow of network traffic responsive to the evasive action.

24. A method according to claim 22, further comprising:

storing the steady state of bandwidth restriction as a retrievable traffic flow control.

25. A method according to claim 22, further comprising:

performing at least one of identifying evasive action or other form of negative response taken by the rogue application and examining at least one of a network address, port and characteristics stored as parameters in a header of each such packet.

26. A method according to claim 22, further comprising:

monitoring a redirected packet flow facilitated by the rogue application.

27. A method according to claim 22, wherein the steady state of bandwidth restriction is sufficient to not trigger evasive action or other form of negative response by the rogue application.

28. A computer-readable storage medium holding code for performing the method according to claim 22.

* * * * *